UNITED STATES PATENT OFFICE.

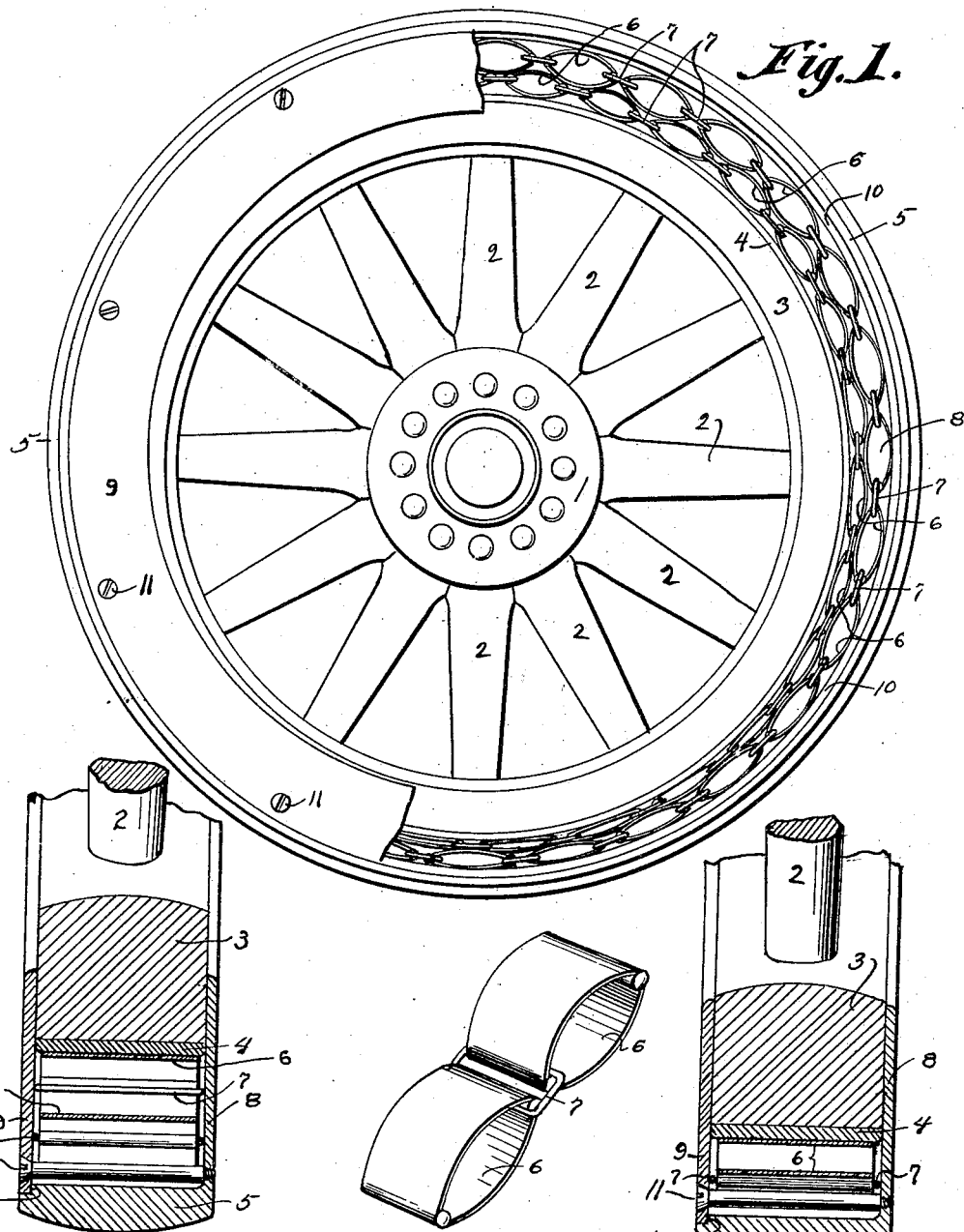

FRANK MORRIS, OF ALLIANCE, OHIO.

RESILIENT VEHICLE-TIRE.

No. 849,156. Specification of Letters Patent. Patented April 2, 1907.

Application filed October 9, 1905. Serial No. 281,985.

*To all whom it may concern:*

Be it known that I, FRANK MORRIS, a citizen of the United States, residing at Alliance, in the county of Stark and State of Ohio, have invented certain new and useful Improvements in Resilient Vehicle-Tires; and I do hereby declare that the following is a full, clear, and exact description of the same, reference being had to the annexed drawings, making a part of this specification, and to the numerals and figures of reference marked thereon, in which—

Figure 1 is a side elevation of a vehicle-wheel, showing my invention applied thereto and illustrating parts broken away. Fig. 2 is a transverse section of the wheel-felly and tire, showing a transverse section of the side plates. Fig. 3 is a detached view showing two spring-sections linked together. Fig. 4 is a transverse section of the wheel-felly and its tire, showing a transverse section of the outer tire and illustrating the position of the outer tire when weight is applied.

The present invention has relation to resilient vehicle-tires; and it consists in the novel arrangement hereinafter described, and particularly pointed out in the claims.

Similar numerals of reference indicate corresponding parts in all the figures of the drawings.

In the accompanying drawings, 1 represents the hub of the vehicle-wheel, which may be of the form shown, or it may be of any other desired form, inasmuch as the hub within itself forms no particular part of the present invention. To the hub 1 are attached the spokes 2, and to the outer ends of the spokes is attached the felly 3, which parts within themselves form no particular part of the present invention so far as their detailed construction is concerned.

Upon the outer periphery of the felly 3 is located and attached in the usual manner the tire 4, which tire is to be formed of a width equal to the width of the felly. The tread-tire 5 is formed of a diameter greater than the diameter of the tire 4 and is so formed for the purpose of providing a space between the outer periphery of the tire 4 and the inner periphery of the tread-tire 5. For the purpose of providing resiliency for the tread-tire 5 springs are interposed between the inner and outer tires, as best illustrated in Fig. 1. The springs consist of a series of short elliptic springs 6, which are connected together by suitable links 7 in substantially the same manner that the links of a chain are connected together, and for the purpose of increasing the elasticity of the tread-tire 5 I prefer to employ two distinct series of springs located concentrical with each other and the springs and links alternated, as illustrated in the drawings, by which arrangement the space between the inner and outer tire is reduced.

The tread-tire 5 is provided with the integral right-angle flange 8, which integral right-angle flange is formed of such a width that it will extend over a portion or all of one of the side faces of the felly 3. Upon the opposite side of the felly 3 is located the ring-plate 9, which ring-plate is formed of a size to correspond, substantially, with the size of the plate 8 and fits the shoulder 10, formed upon the inner periphery of the tread-tire 5. The ring-plate 9 is securely connected to the tread-tire 5, or more particularly to the integral flange 8, by means of the screw 11. It will be understood that the shoulder 10 should be so formed that when the plate 9 is fitted or placed in position the flange 8 and plate 9 are so spaced from each other that they will be free to slide back and forth upon the side faces of the felly 3, but should be in such close contact that no unnecessary looseness is permitted as between the flange 8 and plate 9 and the felly 3.

It will be understood that by my peculiar arrangement I am enabled to produce a resilient tread-tire without any particular reference to the construction of the wheel and can place the same upon any ordinary iron-tired wheel. I do not desire to be particularly confined to any specific construction of the interposed spring or springs, as it will be understood that any variation may be employed without departing from the spirit of my invention. It will be understood that by interposing the springs 6 between the outer periphery of the fixed tire and the inner periphery of the outer tire that the outer tire will be cushioned, thereby providing a vehicle-wheel well adapted for use in automobiles and vehicles of like kind.

Having fully described my invention, what I claim as new, and desire to secure by Letters Patent, is—

1. In a vehicle-tire of the class described, the combination of a felly, a tire fixed thereto, a tread-tire formed of a diameter greater than the felly-tire, said tread-tire provided with an annular shoulder, and an integral right-angled flange, adapted to fit one edge of the fixed tire and felly, a ring-plate adapted to fit the annular shoulder of the tread-tire, the felly-tire and felly, respectively, and secured to said right-angled flange, and a series of elliptic springs linked together and located between the felly-tire and tread-tire, substantially as and for the purpose set forth.

2. In a tire of the class described, the combination of a tire secured to the felly of a wheel, an outer or tread tire formed of a diameter greater than the diameter of the wheel-tire, two series of elliptic springs linked together and the springs and links alternated, substantially as and for the purpose specified.

In testimony that I claim the above I have hereunto subscribed my name in the presence of two witnesses.

FRANK MORRIS.

Witnesses:
J. A. JEFFERS,
F. W. BOND.